Patented Jan. 31, 1939

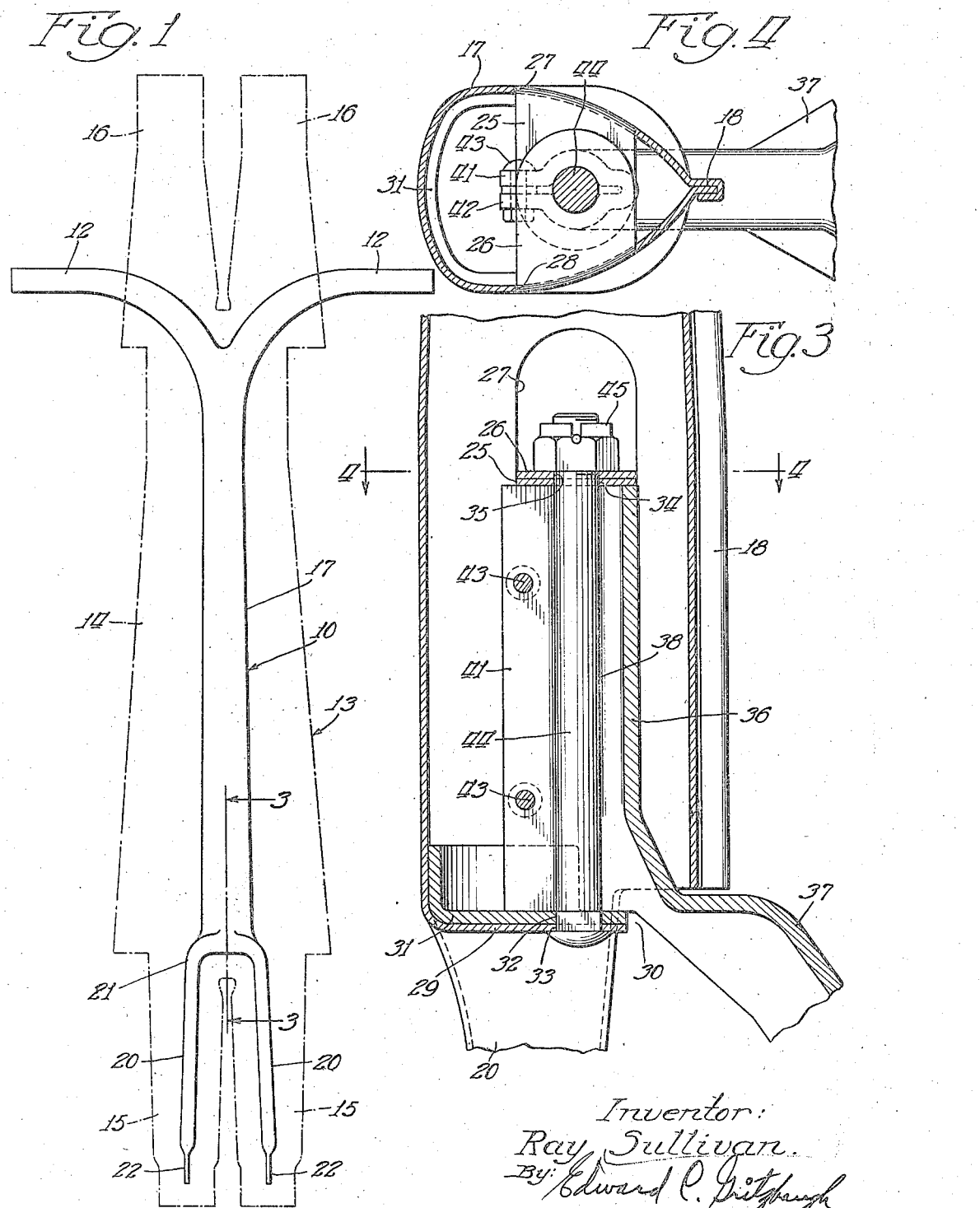

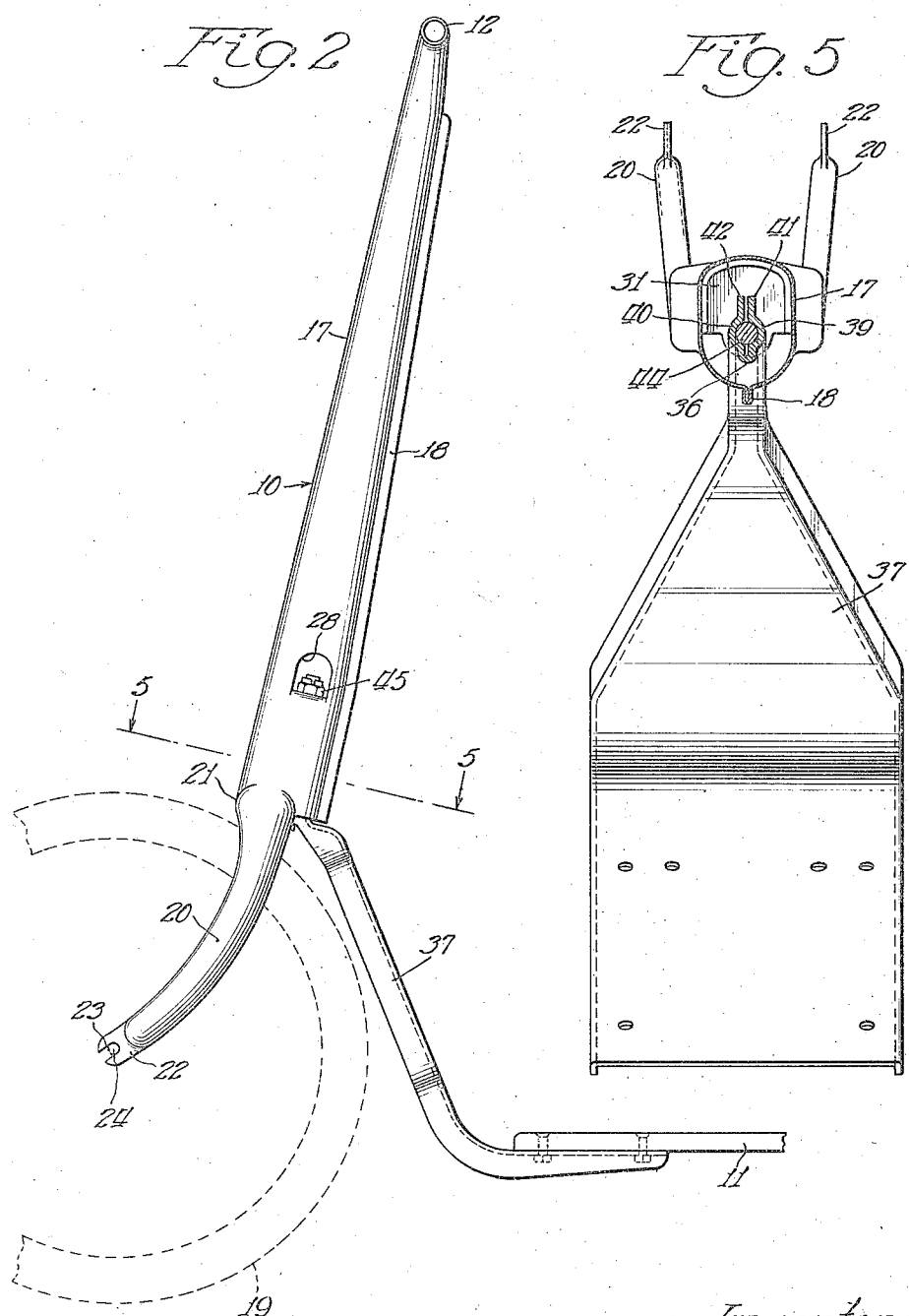

2,145,436

UNITED STATES PATENT OFFICE 2,145,436

BICYCLE

Ray H. Sullivan, Chicago, Ill., assignor to Borg-Warner Corporation, Chicago, Ill., a corporation of Illinois Application August 3, 1936, Serial No. 93,925

2 Claims. (Cl. 280—279)

This invention relates to a bicycle and more particularly to an improved bicycle steering post and method of manufacture thereof.

Among the objects of the present invention is the provision of:

A novel bicycle or scooter steering post having expedient means for effecting a pivotal coupling with other parts of the vehicle.

An improved method of making such a steering post from a single blank of sheet material.

A new frame for a bicycle having a footboard for the rider, the frame including a footboard hanger with a bearing journalled upon a kingpin encased within a hollow section of a steering post.

The structure whereby the above and other desirable objects are attained will be fully understood after reading the following description in conjunction with the accompanying two sheets of drawings hereby made a part of this specification, and wherein:

Fig. 1 is a front elevation of a bicycle steering post constructed in accordance with the present invention, there also being shown in the figure, in dotted outline, a piece of sheet material from which the steering post may be formed;

Fig. 2 is a side elevation of the steering post shown in Fig. 1, the figure also illustrating the manner in which a footboard hanger bracket is attached thereto;

Fig. 3 is a fragmentary sectional view taken on the line 3—3 of Fig. 1;

Fig. 4 is a transverse sectional view taken on the line 4—4 of Fig. 3; and

Fig. 5 is a sectional view taken on the line 5—5 of Fig. 2.

Corresponding parts shown in the various figures of the drawings and described hereinafter are indicated by the same reference characters.

The structure herein disclosed is designed especially for use upon that type of bicycle having a foot-board upon which the operator stands while riding. The steering post 10, Figs. 1 and 2, is of such length that a rider standing upon the footboard 11 may reach forwardly to conveniently grasp the handle bars 12. If my improved steering post is used upon the ordinary scooter type of bicycle, the rider while grasping the handle bars 12 will usually have one foot upon the footboard 11 while propelling the device by periodic pushes given by his other foot upon the ground. Should, however, the steering post be used upon an eccentrically axled rear wheel type of vehicle, the rider will place both feet upon the footboard 11 and propel the same by shifting his weight in such a manner that downward force will be applied to the eccentric axle of the rear wheel while said axle is forwardly of the vertical center line of the wheel, and so that the least amount of weight is applied downwardly while said axle is rearwardly of such center line.

Attention is now directed to Fig. 1, where a blank of sheet material 13 is outlined by a broken line. Said blank has a central tapered elongated body 14 from the lower end of which extend two similarly shaped sections 15. Sections 16 extend upwardly from the upper and narrower end of the elongated body 14.

The shaft or main body of the steering post 10 is formed by bending backwardly the two longitudinal edges of the elongated section 14 of the blank 13 to form a tubular shaft 17. Said edges may be interlocked in a seam 18 shown generally in Figs. 2 and 3 and in detail in Figs. 4 and 5; or a lap or butt-welded joint or other suitable connection may be substituted for the interlocked seam. As may be seen in Fig. 2, the tubular shaft 17 thus formed from the elongated section 14 of the blank 13 increases in cross sectional area from its top toward its bottom. Figs. 4 and 5 which show the shaft 17 in cross section convey additional information as to the shape of the shaft 17. Handle bars 12 are made by curling the edges of the blank sections 16 backwardly to form tubes, and by bending such tubes outwardly as shown at 12 in Fig. 1. If desired, the sections 16 of the blank 13 may be cut to extend laterally from the upper end of main body 14 instead of vertically therefrom as shown in Fig. 1 and in which event the tubular parts formed by curling the sections 16 will require but little or no outward bending to effect the handle bars.

A guide wheel 19 shown dotted in Fig. 2 is held between the tubular legs 20 of a fork 21 extending downwardly from the shaft 17 of the steering post. Fork legs 20 are formed by bending the sections 15 of the blank 13 in such a manner that the edges of such sections are carried backwardly and brought together where they are secured together in a seam. The lower ends of the tubular fork legs 20 are flattened as indicated at 22, and are notched at 23 for receiving an axle 24 of the guide wheel 19. Ears 25 and 26 are formed from side wall sections of the hollow shaft 17, and bent inwardly in overlapping relation as illustrated in Figs. 3 and 4. The spaces from which the ears 25 and 26 are removed leave side wall openings 27 and 28. The bottom wall 29 of the hollow section 17 of the steering post 10 bridges the space between the legs 20 of the guide wheel fork 21. An opening 30 is left between the back side of the wall 29 and the back wall of the hollow shaft 17. A flanged reinforcing plate 31 may be inserted into the hollow shaft 17 and welded or otherwise secured in the position illustrated in Fig. 3. Said reinforcing plate 31 and the bottom wall 29 are apertured at 32 and 33, the apertures being aligned with apertures 34 and 35 in the ears 25 and 26.

The opening 30 in the lower and/or back wall of the hollow shaft 17 is of such a size and shape as to allow the passage therethrough of a bearing head 36 of a footboard hanger 37 into the shaft. The bearing 38 of said bearing head 36 is effected by two opposed semi-cylindrical pieces 39 and 40, which have flanges 41 and 42 projecting forwardly therefrom. Bolts 43 may be used for preventing the flanges 41 and 42 and the bearing sections 39 and 40 from spreading. Said bearing head may be completely assembled before insertion into the lower end of the steering post. Any standard means other than the flanges 41 and 42 and the bolts 43 may be used for holding the forward edges of semi-cylindrical sections in assembly.

Subsequent to insertion of the bearing head 36 into the steering post 10, a king-pin 44 is passed upwardly through the apertures 32 and 33 and through the bearing 38 and apertures 34 and 35 in the ears 25 and 26. Access to the threaded upper end of the king pin 44 may be had through the openings 27 and 28, so that a nut 45 may be turned upon such end of the king-pin for securing the same in place. The king-pin permits freedom of pivotal movement of the steering post 10 with respect to the footboard hanger 37 while lateral or endwise movement of the bearing head 36 with respect to the king-pin 44 is prevented by the reinforcing piece 31 and the ears 25 and 26, which fit closely against the lower and upper ends of the bearing head.

The parts herein described are so designed and shaped as to expedite their manufacture and interfabrication. A strong rugged structure is thus made possible at a low cost of production.

I claim:

1. A vehicle steering post having a guide-wheel fork joined therewith and a hollow section having an apertured lower wall bridging the space between the legs of said fork, an apertured ear bent inwardly from a side wall of said hollow section, there being another wall aperture in said hollow section, and a king-pin, said bottom wall aperture and the aperture of said ear being aligned for receiving said king-pin, and said other wall aperture being adapted to accommodate other vehicle parts into said hollow section for connection with said king-pin.

2. A vehicle steering post having a guide wheel fork joined therewith and a hollow section, a lower wall bridging the space between the legs of said fork, said lower wall having at least two apertures, apertured ears bent inwardly from opposite side walls of said hollow section, the apertures in said ears being aligned, and a king-pin, one of said lower wall apertures and the apertures of the ears being aligned for receiving said king-pin, and another of said lower wall apertures being adapted to accommodate other vehicle parts into said hollow section for connection with said king-pin.

RAY SULLIVAN.